April 8, 1969  R. E. HUMPHREYS  3,437,488
METHOD OF AND APPARATUS FOR THE MANUFACTURE OF FISH BAIT
Filed Dec. 1, 1966

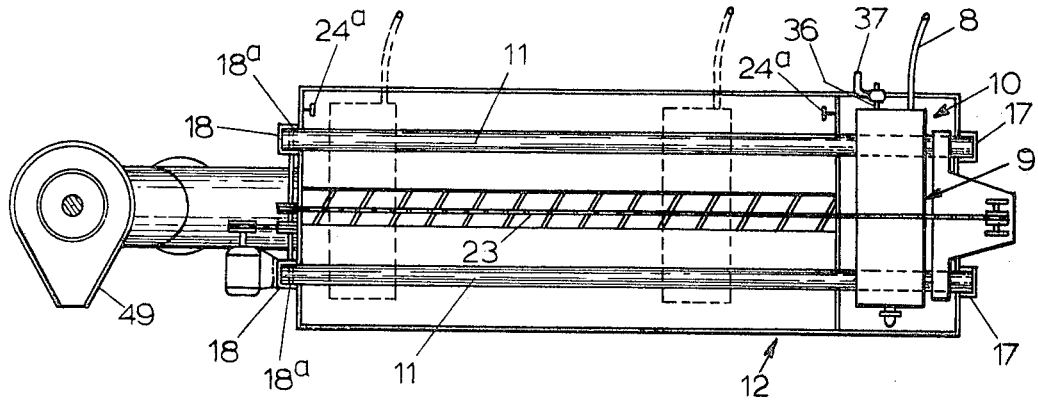
Fig. 2.
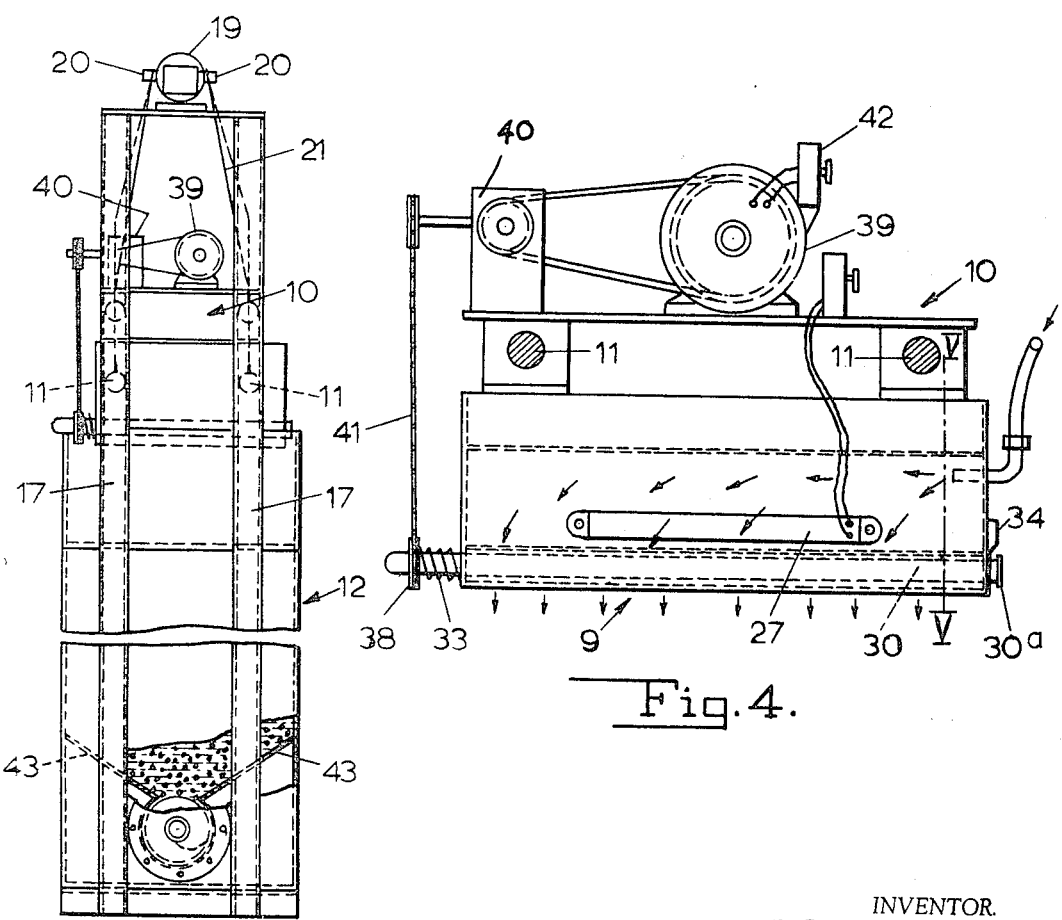
Fig. 4.
Fig. 3.
INVENTOR.
ROBERT E. HUMPHREYS.
BY
Christy, Parmelee + Strickland
ATTORNEYS.

INVENTOR.
ROBERT E. HUMPHREYS.
BY Christy, Pamelee & Strickland
ATTORNEYS.

United States Patent Office 3,437,488
Patented Apr. 8, 1969

3,437,488
METHOD OF AND APPARATUS FOR THE
MANUFACTURE OF FISH BAIT
Robert E. Humphreys, Butler, Pa., assignor to Angler
Products, Inc., a corporation of Pennsylvania
Filed Dec. 1, 1966, Ser. No. 598,493
Int. Cl. A01n *17/14*
U.S. Cl. 99—3         10 Claims This invention relates to the manufacture of fish bait in the form of substantially spherical bodies resembling natural fish eggs or the like, and also in other shapes.

In a copending application, Ser. No. 437,382, filed Mar. 5, 1965 I have disclosed a fish bait and method prepared from gelatin or other protein substance, a hardener to reduce the solubility rate of the protein in cold water, and flavoring and coloring and/or opacifying ingredients. This mix, after being properly conditioned, may be molded or shaped by discharging small amounts into a viscous cold oil bath.

However, there has existed a problem of manufacturing the bait especially in quantities for economical commercial distribution.

The present invention provides a method and apparatus for effecting the uniform manufacture of spherical baits of this type and at an economical production rate. Briefly, the invention contemplates the formation of a basic mix in a mixing vessel and its transfer alternately in increments to smaller capacity staging vessels where final addition of ingredients may be added and the mix held at the proper temperature. From these staging vessels it is transferred to a metering unit movably positioned for travel back and forth over a hardening tank of oil, and the mix is metered from this unit in uniform small portions or globules into the oil bath, distributing these globules into the bath as the metering unit travels along so that the individual masses which assume a spherical form as they descend through the oil free from contact with one another and cure or solidify. At the bottom of the oil bath they are removed and are ready to be placed in the containers in which they are retailed.

This invention may be more fully understood by reference to the accompanying drawings in which:

FIG. 2 is a top plan view of the mechanism of FIG. 1 with the mixing and staging tanks omitted, and for purposes of clarification the drive motor and reducing gear for rotating the metering valve are also omitted;

FIG. 3 is an end view of the apparatus shown in FIG. 1, also with the mixing and staging vessels omitted;

FIG. 4 is a side elevation on a larger scale of the traveling metering unt;

Figure 1:
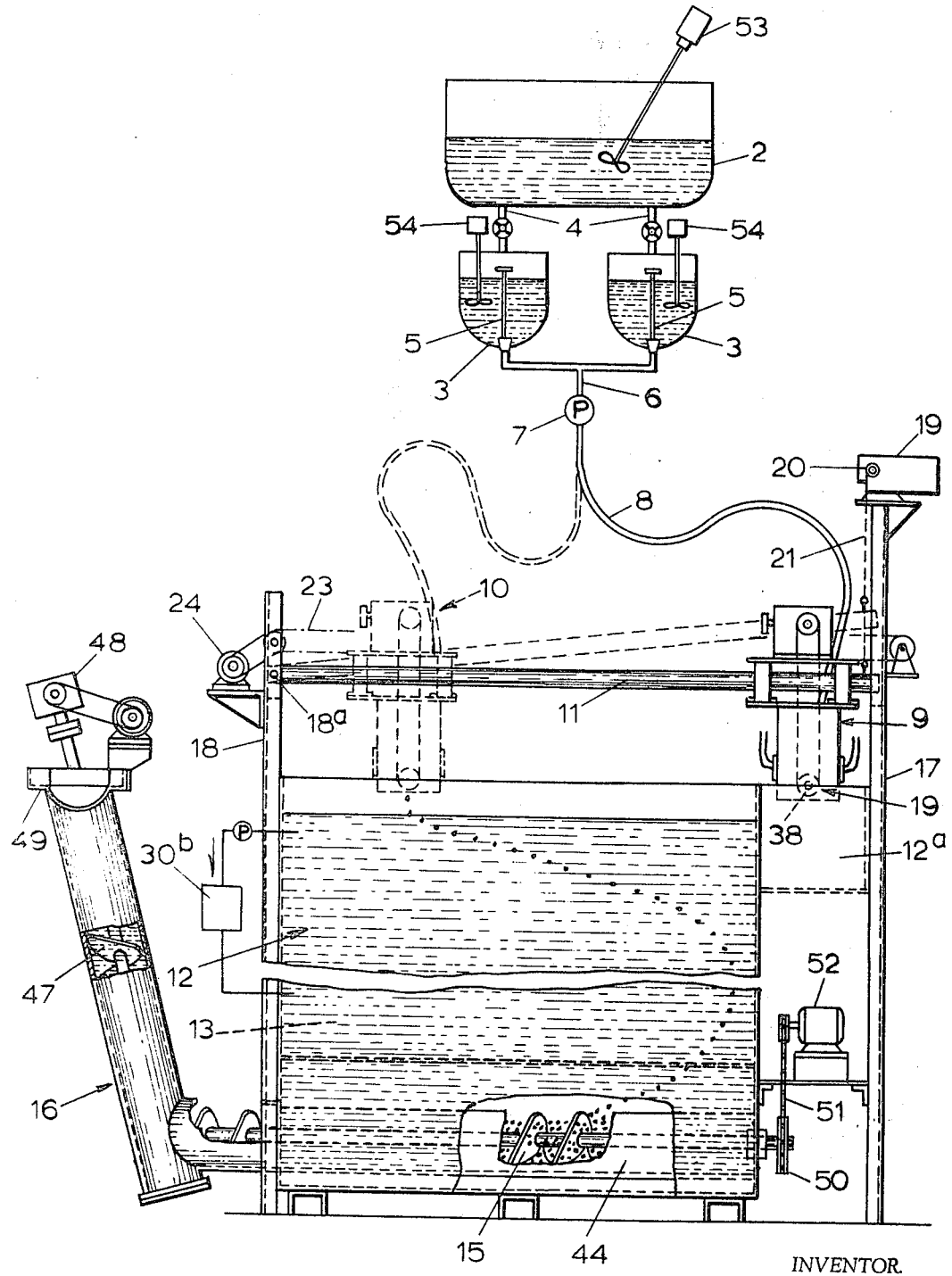
FIG. 1 is a side elevation, partly in section, of one mechanism embodying my invention and for the practice of the process.

It will be understood that in the accompanying drawings details of construction not important to an understanding of the invention are omitted or only schematically shown.

Referring to the drawings, in which like reference numerals indicate corresponding parts, the apparatus embodies generally a main mixing vessel or batch tank 2, at least two similar staging vessels 3 of like size and construction, and a valved pipe 4 is provided on the tank 2 for selectively discharging mix into these vessels. Each of the vessels 3 has a plug valve 5 leading into a common discharge pipe 6. This pipe connects to the inlet of a constant pressure pump 7, such as a gear pump or peristaltic pump. The pump discharges into a flexible tube 8 that delivers mix into the metering unit 9 (hereinafter described in detail) on a recirocating carriage 10 mounted on guide rods 11 for travel back and forth over a tank 12 in which is a body of cold oil, such as paraffin or mineral oil 13. The reciprocating carriage has a rotary metering discharge valve 14 in the bottom thereof so that as the carriage moves along, drops or globules of the mix fall into the liquid bath 13.

At the bottom of the tank 12 there is a conveyor 15 which moves the product from the bottom of the tank to an elevating conveyor 16 for removal of the finished product from the oil.

Referring to the tank 12, it may typically be of the order of eight feet in length, five feet in depth, and perhaps three feet in width. These dimensions are not critical, but are stated for the purpose of indicating a practical size for commercial production. At one end of the tank 12 there is shown a sink or rinsing trough 12a positioned near the top of the tank.

There are parallel upright end posts 17 at the sink end of the tank and similar posts 18 at the opposite end, and the horizontal rods 11 extend between their upper end portions, these rods being pivoted on the posts 18 at 18a so that the other ends of the rods maye be raised and lowered. This raising and lowering may be effected manually, but is preferably effected by a reversing motor 19 that drives reels 20 through a speed reducer with small cables 21 on the reels, the ends of which are attached to the rods.

The carriage 10 is movable along the rods 11. Various means may be used for reciprocating the carriage back and forth along the rods. I have here shown a sprocket chain 23 driven by a reversing motor 24. This chain, attached to the carriage at both ends traverses it along the rod and limit switches, at opposite ends of the travel of the carriage as schematically indicated at 24a (FIG. 2) effect the reversing of the direction of travel. When the carriage is to be moved over the sink the limit switch at the right end of the tank may be rendered ineffective.

Figure 5:
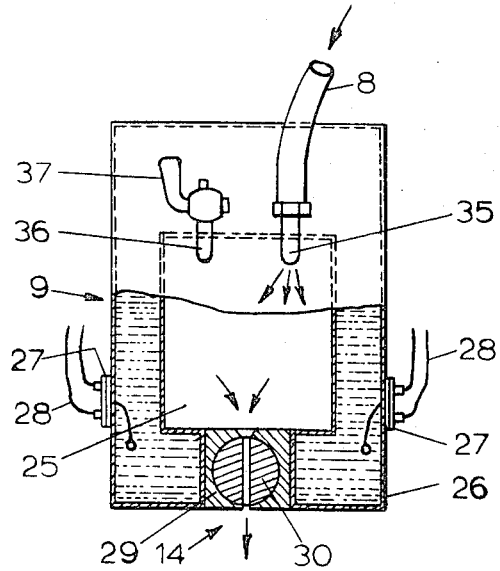
FIG. 5 is an end view of the metering vessel, partly broken away to show in transverse section at the plane of line V—V of FIG. 4 the metering valve.
Figure 6:
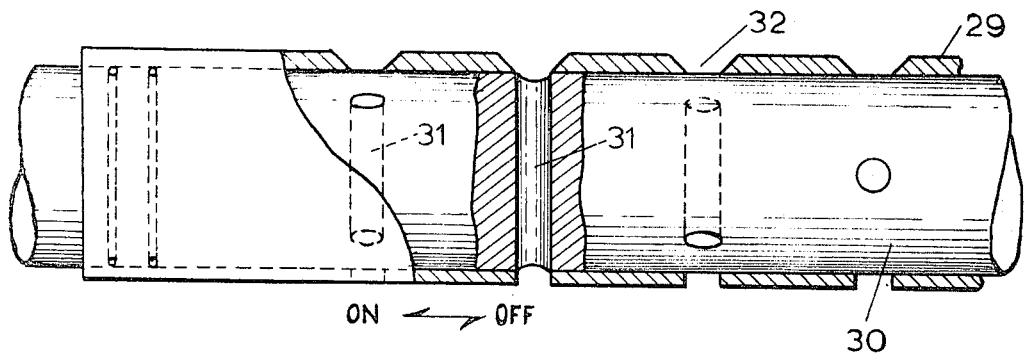
FIG. 6 is a fragmentary view in side elevation of the metering valve.

The carriage extends across nearly the full width of the tank and it carries the metering unit 9. This unit comprises an inner tank or chamber 25 enclosed, except at the ends, in an outer vessel 26 (see FIG. 5). The space surrounding the inner chamber 25 is filled with liquid which is maintained at a predetermined temperature by external electric strip heaters schematically indicated at 27, and which are controlled by a thermostat (not shown) in the conventional manner, current supply wires for the heaters being indicated at 28 in FIG. 5.

At the bottom of the inner tank there is the metering valve arrangement 14 comprising a block 29 with a horizontal cylindrical chamber in which is a rotary valve 30 having ports 31 extending diametrically therethrough, the ports being arranged in a generally spiral spacing along the valve. As the valve rotates, the ports will successively register with openings 32 in the block 29 forming at this location the bottom of the inner vessel 25. In addition to being rotatable, this valve member may be moved endwise to the right as viewed in FIG. 4 against the resilience of a spring 33 and held in this position temporarily by a movable camming plate 34 that may be turned to engage the inner face of a disk 30a on the right hand end of the valve 30 (see FIG. 4) against the end of the shaft to hold it in this position, or released to let the valve move to the left for normal operation. By moving the valve to the right the ports 31 through the valve will be out of register with the openings 32.

The flexible tube 8 from the staging vessels connects to a nipple 35 at one end of the inner vessel 25 and there is also a vent 36 with a pet cock 37 at the same end of the inner vessel or chamber 25 for venting air therefrom.

The rotary valve 30 has a sprocket wheel 38 at one end (see FIG. 4), and a motor 39 on the carriage drives a reduction gear unit 40 through a belt, and this reduction gear has a sprocket that drives a chain 41 that passes around sprocket wheel 38. The motor 39 is a variable speed motor, and 42 indicates a speed control for the motor.

The bottom of the tank has oppositely-sloping bottom plates 43 sloping from the sides of the tank toward a central trough 44 in which is the horizontal screw conveyor 15. This conveyor leads into a vertical conveyor 16 comprising a tube and elevating screw 47 in the tube. The elevating screw is driven by a motor drive indicated at 48. The tube and conveyor extends above the level of liquid in the tanks, and there is a discharge chute 49 at the top of the tube down which discharged product may roll. A drive for the horizontal conveyor screw is provided by a sprocket wheel 50 on one projecting end of the screw, chain 51 and driving motor 52.

The mixing tank or large batch kettle 2 and the staging vessels 3 are hot water, steam, electrically, or otherwise heated, the heating means being of any conventional type. In operation a mixture of animal protein such as gelatin, glycerine and water, preferably with a food preservative such for example as sodium propionate is prepared in the batch kettle 2 and brought to a temperature of about 160° F. A mixer is schematically indicated at 53. When the gelatin has been dissolved and the solution has acquired the desired temperature, being agitated while being prepared, a portion of the mix is run into one of the staging vessels 3 for final preparation. In the staging vessel coloring may be added, the pH is desirably adjusted in the range between 5.2 and 5.4, and a vegetable stabilizer carageenan, derived from seaweed in the ratio of about 2% of the gelatin mix from the batch tank is added. This makes the mixture more temperature stable so the product will better withstand handling at body temperature or even ambient temperatures that may be encountered in warm climate. The tanning or curing agent, usually hexamethylene tetramine, is added at this stage to make the protein less water soluble. A mixer for each staging vessel is indicated at 54. After all ingredients have been added, the mixture is held at 160° F. for about 15 minutes, when it is ready for processing. The mix has a limited pot life once this period has passed, so that the contents must be promptly processed after this period, and while the contents of one staging vessel are dispensed, the second staging vessel is charged and made ready for use, and in this manner each staging vessel is alternately used. Since the mixture gels rapidly on cooling, the temperture in the metering chamber is kept at about 160° F.

The mix in the staging vessel is somewhat viscous, but flows by gravity, aided by the pump 7, through tube 8 into the vessel 25 of the metering carriage unit. At start-up the rotary valve 30 is inoperative and is pushed to the right as above described so as to close the bottom of chamber 25 against any outflow of the mix. The carriage may at this time be over the rinsing sink 16 and the pet cock 37 is open to bleed away any entrapped air from the chamber. When the mix appears at the pet cock, the pet cock is closed, and the vessel 25 is then full and the operation is ready to start.

Motor 19 is first energized to lift the rods 11 with the carriage to a level where the bottom of the metering unit will clear the end wall of the tank, and the carriage is then traversed to a position over the inside of the tank and the rods 11 lowered to a horizontal position where the bottom of the metering unit is usually in the range between an inch and two inches of the level of the cold oil bath 13 in the tank. The rotary valve is then released to move endwise to its operating position, and the driving motor for rotating it is started. The traversing motion of the carriage is continued, and drops will be metered through the ports 31 to fall into the oil bath.

The size of the drops and the resulting formed product may be adjusted by the temperature of the fluid in the chamber 25, the speed of rotation of the metering valve, the pressure generated by the pump 7, and the composition of the mix, and also the size of the ports 31.

Since the ports 31 in the valve are angularly offset or staggered, they open progressively, preventing any sudden pressure changes such as would occur if the ports were in line to all open at one time. The drops fall free of one another, being separated crosswise of the tank, and also being separated by the longitudinal travel of the metering unit carriage 10 on the rods 11. Should the ports or bottom of the unit collect any accumulation of the mix that interferes with drop formation, the unit may be returned to position over the sink and exteriorly rinsed with water, as may also be done at the close of the day when water may also be flushed through the unit from the staging tanks.

The drops descend slowly through the cold bath 13 of mineral and/or vegetable oil, or oil mixture and in their free-moving decent assume a spherical form. The cooling of the descending bodies in the bath sets the gel and effects the curing so that they become tough, somewhat elastic balls which are insoluble in oil, but slowly dissolve in water so that when they are subsequently used they attract fish when they are used as bait. The finished product is removed from the oil bath by the conveying arrangement at the bottom and end wall of the tank.

Depending on the viscosity of the oil, and the depth of the oil bath, it should be chilled. This is desirably accomplished by pumping it from the tank through a refrigerated heat exchanger and returning it to the tank in a well-known apparatus, here indicated in line diagram at 30b. With straight mineral oil, i.e., paraffin oil, the bath should be around 30° to 32° F. At colder temperatures the pellets may freeze, and even at 32° F. prompt removal is desirable to preclude dehydration. At warmer temperatures and less depth the product may be of elongated capsule shape. The formulation of the mix is more fully described in the above mentioned application which, in so far as it is applicable is incorporated herein by reference.

The method and apparatus provides for the production in quantity of individual baits of uniform size and shape, and as above indicated, the size and shape may be changed by the adjustment of the various conditions above described, a spherical form usually being preferred.

While I have described a specific embodiment of the invention, it will be understood that various changes and modifications may be made in it. For clarity of illustration cooling means for the oil and heaters for the mixing tanks, which may be of various known types, such as immersed coils or panels, are not shown.

I claim:
1. In the process of making fish bait from a preparation comprising gelatin, glycerine and water to which a curing agent comprising hexamethylene tetramine is added to cure the mix and reduce the solubility of the gelatin in water and the mix thereafter formed into individual baits, the steps comprising
  (a) first forming a heated batch mixture of the gelatin, glycerine and water in a batch tank;
  (b) transferring a portion of said batch from the batch tank to a first staging vessel and adding the curing agent thereto while maintaining it heated;
  (c) discharging the mix from the staging vessel to a metering device and maintaining it at a controlled temperature in the metering device;
  (d) dropping the mix from the metering device in small uniform globules;
  (e) moving the metering device over a bath of cold oil in which the mix is insoluble into which the globules of the mix drop and through which they descend in spaced intervals from one another to congeal the globules;

(f) then removing the congealed globules from the bottom of the bath.

2. The steps in the process of making fish bait as defined in claim 1, wherein more of the batch from the batch tank is transferred to a second staging vessel where the mix is completed as in the first staging vessel and held in heated condition while the contents of the first staging vessel are being metered into the bath, discharging mix from the second staging vessel when the first is empty and repeating this use of one staging vessel and then another and so operating one staging vessel and then the other that the mix is retained in each staging vessel a period of time after the hexamethylene tetramine has been added to assure congealing of the globules in the oil bath but emptying each staging vessel before the pot life of the mix has terminated and the metering device is continuously supplied with the mix until the entire batch is exhausted.

3. The steps in the method of preparing fish bait as defined in claim 1 wherein carageenan as a stabilizer is added to the mix in each staging vessel to raise the softening temperature of the congealed product, said stabilizer being about 2% of the total mix in the staging vessel.

4. Apparatus for the forming of fish bait from a gelatinous mix or the like which comprises (a) a tank;
(b) a metering unit supported for movement over the tank;
(c) means for moving the metering unit back and forth over the tank;
(d) the metering unit having a chamber for holding a quantity of the mix;
(e) valve means operable while the unit is in motion for metering the mix in globules of predetermined size from the said chamber;
(f) an oil bath in the tank, said oil bath being chilled to effect congealing of the globules;
(g) and means for removing the congealed globules from the bottom of the bath.

5. Apparatus for the forming of fish bait as defined in claim 4 having means for supplying the mix to said chamber and maintain a substantially constant pressure of the mix therein.

6. Apparatus for the forming of fish bait as defined in claim 4 wherein said chamber has means operable for the venting of air therefrom and except for the vent means and said valve means is otherwise closed, and means for applying mix at a controlled rate to said chamber to maintain a substantially constant pressure therein.

7. Apparatus for forming fish bait as defined in claim 4 wherein said valve means extends transversely of the direction of travel of the metering unit and has a plurality of discharge ports therethrough arranged to open in sequence when the valve is operated to space the dropping of the globules into the oil bath transversely as well as in the direction of travel of the unit when the valve is operating and the unit is moving back and forth over the tank.

8. Apparatus for forming fish bait as defined in claim 7 in which said valve means is movable from a normal operating position to an inoperative position where all of the ports therein are closed to enable pressure to be established in said chamber at the start up of the unit.

9. Apparatus for the forming of fish bait as defined in claim 4 having means for supplying the mix to said chamber and maintain a substantially constant pressure of the mix therein, said means for supplying mix to the chamber comprising a batch mix tank for the initial preparation of the mix, at least two staging vessels with means for selectively connecting them to the batch mix tank to receive mix therefrom, said staging vessels holding a lesser amount than the batch tank and in which a curing agent is added to the mix, each staging vessel having a discharge valve for selectively controlling the discharge of mix therefrom, and a common supply line including a pump arranged to receive mix selectively from the staging vessels and deliver it to said chamber of the metering unit at a controlled rate, whereby mix may have curing agent added thereto in the staging vessels and to stand for a limited time while mix is being discharged from the other staging vessel to the metering unit to thereby enable the metering unit to be continuously supplied with mix ready for metering after start-up for an indefinite time and each staging vessel emptied before the pot life of the mix with curing agent has passed.

10. Apparatus for forming fish bait as defined in claim 4 wherein means is provided for holding the mix in the chamber heated.

References Cited

UNITED STATES PATENTS

| 635,925 | 10/1899 | Gindele | 18—2.7 X |
| 1,762,693 | 6/1930 | Linebarger | 18—2.7 X |
| 3,070,837 | 1/1963 | Loertscher et al. | 18—2.7 X |
| 3,208,101 | 9/1965 | Kaiser et al. | 18—2.7 X |

WILLIAM J. STEPHENSON, *Primary Examiner.*

U.S. Cl. X.R.

18—2.7; 264—4, 13